Aug. 18, 1953     S. W. ALDERFER     2,649,391

SPONGE RUBBER PRODUCT

Filed April 15, 1950

INVENTOR.
STERLING W. ALDERFER
BY
ATTORNEYS

Patented Aug. 18, 1953

2,649,391

UNITED STATES PATENT OFFICE 2,649,391

SPONGE RUBBER PRODUCT

Sterling W. Alderfer, Akron, Ohio, assignor of three-tenths to Edward D. Andrews, Akron, Ohio Application April 15, 1950, Serial No. 156,201

3 Claims. (Cl. 154—46)

The present invention relates to a new and useful product composed of sponge rubber, or similar material, permanently attached to a fabric backing. While fabric-backed, sponge rubber sheeting has been proposed heretofore, the prior products do not possess the useful properties and characteristics of the product shown herein nor are they adapted to the numerous and varied uses to which the product of this invention is suited.

Prior fabric-backed, sponge rubber sheeting has been made by first preparing the sheet of sponge rubber and then adhesively uniting one side of the sheet and the fabric backing. The adhesive closes up the air passages in the fabric and on the underside of the sponge rubber sheeting so that the resultant product is not porous throughout and cannot "breathe" or ventilate. The product is therefore unsuitable for many purposes. In addition, the surfaces of sponge rubber sheeting made by prior processes are apt to be deeply pitted and do not present a smooth finish, which is one of the characteristics of the product shown and described herein.

In some cases, a sponge rubber sheet is split in much the same manner that hides are split and one of the split sheets attached to the backing. Sheeting made by this method has a very rough finish and is unsuitable for many of the uses to which the improved product shown and described herein is adaptable.

The product of this invention is characterized by the presence of a sheet or layer of sponge rubber and a fabric backing, to which it adheres by the penetration of the rubber foam or sponge before it has set and while it still contains a large percentage of free water which penetrates into the interstices of the fabric, carrying the latex with it. This secures a firm bond between the fabric and the sponge, yet it does not close up the pores of the fabric or on the under surface of the sponge rubber layer. As the body of sponge rubber is composed of a multitude of very minute, evenly distributed and inter-communicating cells, the composite product is permeable throughout, so that air can pass readily through it. This makes it possible to obtain a fabric-backed sponge rubber cushion which will breathe and hence is cool and comfortable, so that it has many uses for which the earlier types of non-permeable sponge and fabric products are not usable.

Due to the method by which the sponge rubber is applied to the fabric and by which it is set thereon, the exposed surface of the sponge rubber is apparently smooth and unbroken, the pores on the surface not being visible to the naked eye. This gives the appearance of a calendered surface to the product, which imparts a finish to the product and not only improves its appearance but gives it an adaptability to numerous uses to which the old types of product are not adaptable.

The surface is pleasant and velvety to the touch and feels like a very soft chamois. The product, therefore, may be used for articles which come in contact with the human body. The product is soft and yielding, and yet has a substantial resilience so that it is easily permanently deformed but readily resumes its original condition after pressure thereon is relieved.

Some of the uses to which the product may be put are the manufacture of seat covers, mattress covers, carpet and rug linings, insole linings, card table covers, powder puffs, hat bands, paddings of all sorts, ink pads, rubber stamps, and many others.

The drawings show a piece of the finished material and also indicate one of the approved ways in which the product may be made and by which the useful properties and characteristics are obtained, but it will be understood that this application is specifically directed to the finished product and that the method by which it is made may be altered or modified.

The product consists of a layer of sponge rubber or similar sponge product and a backing layer of a woven or knitted fabric. The former is indicated at 1. It is preferably made by foaming and beating rubber latex with a volume of air so that a uniform, foam-like mass is obtained. Various types of beaters are in use for performing this operation, it being essential that the air and latex be thoroughly mixed and beaten so that a multiplicity of fine bubbles or pockets are formed, uniformly distributed throughout the latex. The latex is compounded with the usual vulcanizing and aging ingredients and with a foaming agent, such as soap, before the beating operation. When the beating operation is completed, setting or gelling agents are added, as is well known in this art.

A mass of beaten and foamed latex will contain a large amount of water and it will be found that in the finished product the minute air cells or pockets are in communication throughout the mass.

Freshly foamed latex, made in the manner set forth, is poured or spread upon a smooth surface to the depth required. In the manufacture of a variety of products, the depth of the layer of foamed latex may vary in accordance with the requirements. In actual practice, a depth of one-quarter of an inch or more is frequently employed.

Figure 1:
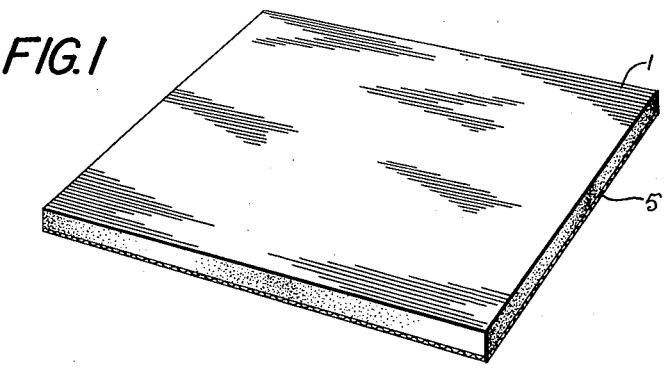
Fig. 1 is a perspective view showing a sheet or block of the finished product.
Figure 2:
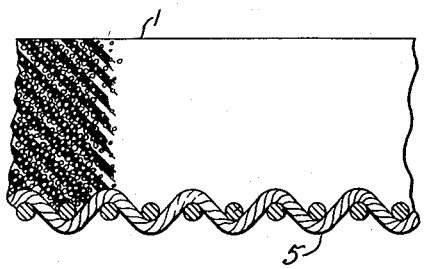
Fig. 2 is an enlarged cross-section thereof in which a showing of the structure of the air cells has been attempted. These pores and cells are so minute that it is impossible to show their actual size in the limitations of a patent drawing.
Figure 3:
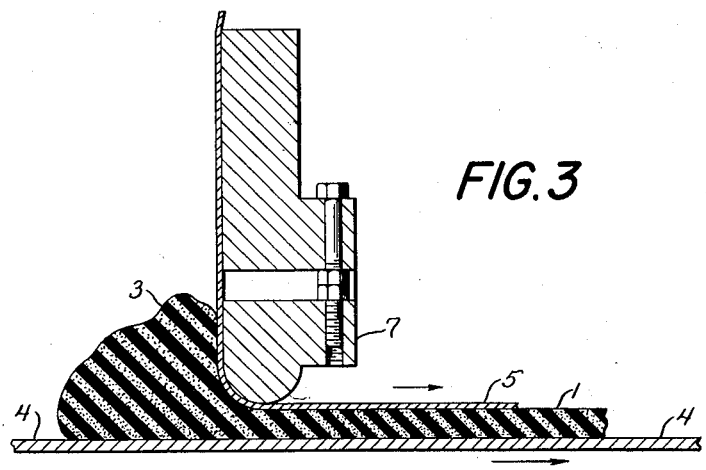
Fig. 3 is a schematic view showing the method by which the product is assembled and by which the distinctive properties of the product are secured.

In Fig. 3, a mass of freshly foamed latex containing the requisite gelling agent or agents is indicated at 3 and, in this view, the mass has been poured onto a smooth surfaced belt 4 which may be made of leather, rubber, or stainless steel. Whatever material is used, the surface on which the mass of foamed latex is spread is kept smooth, polished, and free of dirt or traces of old latex. It is preferred, for production purposes, that the receiving surface be in motion, traveling in the direction of the arrow in Fig. 3. It would be possible to use a stationary plate or sheet in the manufacture of the product by the batch method, but the continuous belt method is preferred.

The fabric layer or backing, which is indicated at 5, is applied to the upper surface of the foamed layer on the supporting surface. In the preferred method, the fabric is brought into contact with the mass of rubber foam at the point where the latex foam is reduced to the requisite depth. This is preferably done by leading the fabric beneath a doctor roll or doctor bar 7, spaced above the belt 4 at the requisite height, the latex massing up in front of the doctor and moving through the pass between the doctor and the belt at the required depth. As the mass of latex contacts the fabric, some of the water in the latex permeates and may be absorbed by the fabric. This water will carry with it some of the foamed latex which will firmly embed itself in the interstices of the fabric so that the layer 1 is securely anchored to the fabric. Any type of textile fabric may be employed, such as muslin, duck, drilling, nylon or artificial plastic fabrics such as used for seat covers, silk, burlap, or the like. It should be a woven or knitted fabric so that the foamed latex may penetrate the fabric, and water absorbent properties are not essential. The degree of penetration is not important and, in the case of almost all fabrics, the latex is not carried to the back or exposed side of the fabric but penetrates only sufficiently to firmly knit with the fabric.

From the point at which the fabric is applied, the belt 4 moves through a heated oven, maintained at the correct temperature to cause the foamed latex to set or gell under the influence of the setting agent, thus preserving the fine cellular structure. After the foam is set, the product will leave the belt and will be passed through a vulcanizing chamber for vulcanizing the rubber sponge. It is desirable to hold the fabric from shrinking during the vulcanizing process and this may be done by the use of well known tentering frames or belts. In case the continuous method is not employed, equivalent steps will secure the same results in a plate and batch method.

By causing the sponge rubber foam to set while it is in contact with a smooth surface, such as the belt 4 or its equivalent, the outer or exposed surface of the sponge rubber layer acquires the smooth, velvety surface which is characteristic of the product of this invention. It will be found that the finished product is permeable throughout and that air will readily pass from one surface to the other. This can be demonstrated by blowing cigarette smoke through a sample thereof.

The method of manufacturing the product is not intended to be covered herein, the preferred method and suitable apparatus for manufacturing the product being covered in co-pending application, Serial No. 156,203, filed April 15, 1950, now Patent No. 2,628,654.

While the use of rubber latex has been referred to herein as the preferred material for the foamed layer, any substitute therefor may be employed. Where the term "rubber sponge" or the like is employed in the specification and claims, it is intended that equivalent material which can be foamed in a manner similar to rubber latex, and having similar properties, is intended to be included thereby. By the term "textile fabric" or the like, it is intended to cover any woven or knitted fabric suitable for the purpose.

It will be understood that other modifications and variations of the invention, such as would be suggested to one skilled in the art and as fall within the scope of the invention as defined in the claims, are intended to be covered thereby.

The product is suitable for use with either side thereof exposed. In the manufacture of seat covers, cushions, pads, and the like, the textile fabric will be exposed. In the manufacture of card table covers, insoles, powder puffs, and the like, the smooth surface of the foamed sponge will be exposed.

What is claimed is:

1. As a new article of manufacture, a product comprising a vulcanized layer of foamed and gelled rubber latex having a multitude of minute air cells distributed throughout the layer and communicating with each other, and a textile fabric attached to one surface of the said layer by penetration of the latex into the fabric, the interstices of the fabric being in communication with the cells in the said layer, the foamed layer having a porous outer surface which is smooth and planished to the extent of reflecting highlights, and said outer surface being further characterized in that all of the pores therein are microscopic pores of substantially uniform size, substantially uniformly distributed over the entire outer surface.

2. As a new product, a sheet of fabric having a plurality of interstices therein and a relatively thick layer of vulcanized, foamed and gelled rubber latex having a vulcanized bond with one surface of the fabric, the said layer having a multitude of minute air cells uniformly distributed throughout, said air cells being in communication with each other and the interstices of the fabric, and with the outer surface of the layer, the layer having a porous outer surface which is smooth and planished to the extent of reflecting highlights, and said outer surface being further characterized in that all of the pores therein are microscopic pores of substantially uniform size, substantially uniformly distributed over the entire outer surface.

3. As a new product, a flexible sheet and a layer of vulcanized, foamed and gelled rubber latex having a vulcanized bond with one side of the sheet, the said layer having a multitude of minute air cells uniformly distributed throughout the layer, the exposed outer surface of the layer being porous and having a texture and feel similar to high grade chamois, said outer surface being smooth and planished to the extent of reflecting highlights, and said outer surface being further characterized in that all of the pores therein are microscopic pores of substantially uniform size, substantially uniformly distributed over the entire outer surface.

STERLING W. ALDERFER.

References Cited in the file of this patent

UNITED STATES PATENTS

| Number | Name | Date |
|---|---|---|
| 2,140,026 | Murphy et al. | Dec. 13, 1938 |
| 2,163,289 | Pennel et al. | June 20, 1939 |
| 2,271,058 | Binns | Jan. 27, 1942 |